US012790465B2

(12) United States Patent
Tavas et al.

(10) Patent No.: US 12,790,465 B2
(45) Date of Patent: Nov. 10, 2026

(54) SYNTHETIC WOOD PRODUCT

(71) Applicant: SYMMETRY WOOD, PBC, Los Angeles, CA (US)

(72) Inventors: Gabriel Enrique Badia Tavas, Chicago, IL (US); Timothy D. Keating, Chicago, IL (US)

(73) Assignee: Symmetry Wood, PBC, Los Angeles, CA (US)

( * ) Notice: Subject to any disclaimer, the term of this patent is extended or adjusted under 35 U.S.C. 154(b) by 610 days.

(21) Appl. No.: 18/115,606

(22) Filed: Feb. 28, 2023

(65) Prior Publication Data

US 2023/0272191 A1 Aug. 31, 2023

Related U.S. Application Data

(60) Provisional application No. 63/314,859, filed on Feb. 28, 2022.

(51) Int. Cl.

| | |
|---|---|
| ***B27N 3/04*** | (2006.01) |
| ***B27N 1/02*** | (2006.01) |
| ***B27N 3/00*** | (2006.01) |
| ***B27N 3/08*** | (2006.01) |
| ***C08L 1/02*** | (2006.01) |
| ***C08L 5/00*** | (2006.01) |
| ***C08L 5/12*** | (2006.01) |

(52) U.S. Cl.

CPC .................. *C08L 1/02* (2013.01); *B27N 1/02* (2013.01); *B27N 3/002* (2013.01); *B27N 3/04* (2013.01); *B27N 3/08* (2013.01); *C08L 5/00* (2013.01); *C08L 5/12* (2013.01)

(58) Field of Classification Search

CPC . B27N 1/02; B27N 3/002; B27N 3/04; B27N 3/08; B32B 9/02; C08L 1/02; C08L 5/00; C08L 5/12

See application file for complete search history.

(56) References Cited

U.S. PATENT DOCUMENTS

| | | | | |
|---|---|---|---|---|
| 5,207,826 | A | 5/1993 | Westland et al. | |
| 11,033,050 | B2 | 6/2021 | Moshasha et al. | |
| 11,752,737 | B2 | 9/2023 | Luttwak | |
| 12,122,065 | B2 | 10/2024 | Bradshaw et al. | |
| 2011/0014425 | A1 * | 1/2011 | Wirz ........................ | B27N 3/00 427/209 |
| 2020/0198177 | A1 * | 6/2020 | Kinio ................. | C08G 18/3218 |
| 2024/0001585 | A1 | 1/2024 | Chanana et al. | |
| 2025/0010511 | A1 | 1/2025 | Bradshaw et al. | |
| 2025/0170807 | A1 | 5/2025 | Luttwak | |
| 2025/0205925 | A1 | 6/2025 | Hu et al. | |
| 2025/0263887 | A1 | 8/2025 | Gomez-Ortigoza Aguirre et al. | |

FOREIGN PATENT DOCUMENTS

| | | | | |
|---|---|---|---|---|
| WO | WO-2017123104 | A1 * | 7/2017 | ........... B27N 1/0209 |
| WO | 2019136036 | A1 | 7/2019 | |

* cited by examiner

*Primary Examiner* — Gerard Higgins
(74) *Attorney, Agent, or Firm* — Barnes & Thornburg LLP

(57) ABSTRACT

A synthetic wood, systems and methods for producing the synthetic wood as an alternative to naturally grown wood or plant cellulose includes forming and processing bacterial cellulose. The resulting synthetic wood is stable at room temperature and exhibits a hardness similar to naturally grown wood or plant cellulose products obtained from high-value wood subject to deforestation.

7 Claims, 6 Drawing Sheets

SYNTHETIC WOOD PRODUCT

CROSS REFERENCE TO RELATED APPLICATION

This application claims the benefit of priority under 35 U.S.C. § 119(e) to U.S. Provisional Patent Application No. 63/314,859, filed Feb. 28, 2022, which is incorporated herein by reference in its entirety.

The present teachings relate generally to organic synthetic wood products and, in some embodiments, to substitutes for high-value wood (plant cellulose) that are produced using bacterial cellulose. Methods of making the synthetic wood products are also described.

BACKGROUND

Deforestation continues to destroy valuable natural resources and animal habitats. In 2021 alone, the Institute for Man and the Environment of the Amazon estimated that the rate of deforestation of the Amazon increased by 33% over the same period in 2020. Many commercial alternatives to wood products further contribute to environmental degradation, including rubber-based products, and petroleum-based plastics. Organic alternatives are often more easily bio-recycled, leading to a search for such stable compounds. Bacterial cellulose alternatives often degrade rapidly when exposed to water, and are thus not suitable for use in environments subject to dampness. Other mixed materials include pykrete, a mixture of sawdust and frozen water. Under the right conditions, pykrete can have an impact resistance reportedly exceeding some forms of concrete and was even explored by the British military for ship construction. However, pykrete is limited by temperature, in that the ice components eventually melt. Accordingly, there is a room in the art for stable cellulose-based alternatives to wood and plastic materials.

SUMMARY

The scope of the present invention is defined solely by the appended claims and is not affected to any degree by the statements within this summary.

Synthetic wood that includes bacterial cellulose and one or more gels is described. The synthetic wood may be free of plant cellulose and may contain water in amounts less than about 5%. The one or more gels may include those selected from agar, organic gelatins, xanthan gum, alginate, carrageen, hydrocolloids, sodium alginate, propylene glycol alginate, carrageenan, cellulose gum, microcrystalline cellulose (MCC), gellan gum, guar gum, gum Arabic, locust bean gum, and mixtures thereof. Advantageously, the synthetic wood may be used to form articles of manufacture similar to those formed using naturally grown wood (i.e., from plant cellulose) without the environmental impact caused by tree harvesting.

The described synthetic wood may also include a binder, an additive, or mixtures thereof. The binder may be any one or more of those selected from guar gum, ammonium lignosulfonate, chitosan, lignin, arrowroot, cassava, tapioca, *yucca*, manioc, organic starch, potato starch, pectin, [poly (Acrylic acid-co-N-Methylol Acrylamide-co-Butyl Acrylate) Copolymer Grafted Carboxymethyl Cellulose], soy protein, polyacrylic acid, liquid plant hydrolysate, magnesium oxide, xanthan gum, agar, seaweed extract, kelp, sulfite liquor, wheat flour, sucrose, and mixtures thereof. The additive may be any one or more of polyhydroxyalkanoate (PHA), polylactide (PLA), polybutylene adipate terephthalate (PBAT), polybutyl succinate (PBS), cellophane, glycerol monostearate, shellac, wax, natural gum, castor oil, flax oil, linseed oil, menthol crystals, zein, dyes, colorants, glycerin, alcohols, polyols, and mixtures thereof.

Methods of making the synthetic wood, which may be free of plant cellulose include providing bacterial cellulose; combining the bacterial cellulose with a gel to form a mixture; at least partially dehydrating the mixture to form a semi-solid mass; compressing the semi-solid mass; and dehydrating the compressed semi-solid mass to remove water present in the compressed semi-solid mass and to form the synthetic wood. The bacterial cellulose may be provided as a solid product, as a mixture of bacterial cellulose and water (and other components that may be present from the manufacture of the bacterial cellulose), or as a combination of a solid product and a mixture.

In some embodiments, the dehydrating and compressing may be conducted sequentially or, in some instances, may be conducted simultaneously.

Additionally or alternatively, the method may include adding a binder and/or an additive before, during, or after combining the bacterial cellulose with the gel. The binders and additives include those mentioned above.

As used in the description and claims, the term "synthetic wood" refers to a product that has properties similar to that of natural wood, i.e., wood produced from trees or plant cellulose without containing plant cellulose. In other words, the described and claimed synthetic wood is free of plant cellulose.

References to a percentage in the following description and claims refer to a percent by weight unless specifically noted otherwise.

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION

Figure 1:
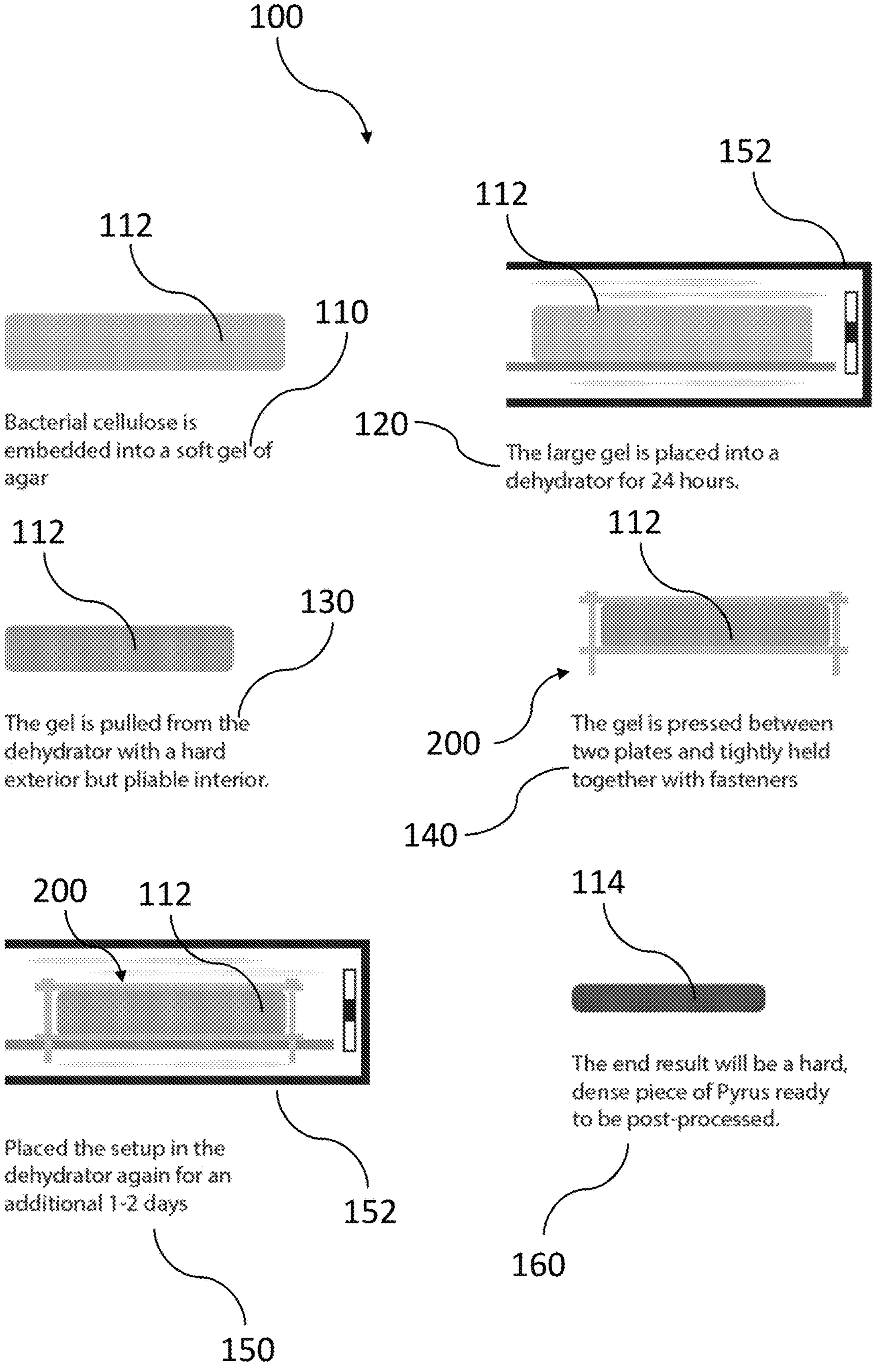
FIG. 1 depicts one embodiment for producing synthetic wood products as an alternative to natural wood (plant cellulose) and plastic.

Turning now to FIG. 1, a process for creating a synthetic wood product is shown. The process 100 includes providing bacterial cellulose and mixing the bacterial cellulose with a gel to form a mixture 112. In some instances, binders and/or additives may be incorporated with the mixture, before forming the mixture (e.g., by mixing the bacterial cellulose with the binders and/or additives prior to mixing with the gel), during the formation of the mixture, or after the formation of the mixture. Thereafter the mixture 112 is dehydrated for a period of time to remove water and to form a semi-solid mass having a hard exterior with a pliable interior. The solid mass is compressed along a single axis although it is contemplated that the semi-solid mass may be compressed along one, two, or three axes. The compression can be effected using any suitable apparatus. While the semi-solid mass is being compressed, the semi-solid mass may be further dehydrated for a period of time to remove all or substantially water or liquid the present in the semi-solid mass to form the resulting synthetic wood.

As noted above, the described process includes providing a bacterial cellulose that is mixed with a gel. Generally, bacterial cellulose (BC) is a natural biomaterial synthesized by bacteria. It possesses a unique structure of cellulose nanofiber-weaved three-dimensional reticulated network that endows it with excellent mechanical properties, high water holding capability, and outstanding suspension stability. Bacterial cellulose may be synthesized by a bacteria such as, but not limited to, the genera *Gluconacetobacter, Aerobacter, Rhizobium, Sarcina, Azotobacter, Agrobacterium, Pseudomonas*, and *Alcaligenes*. Advantageously, bacterial cellulose is free of lignin, hemicellulose, and pectin, which are found in plant-based cellulose. Moreover, bacterial cellulose has a higher degree of polymerization than plant cellulose and typically has high crystallinity with short disordered sections as intervals, which likely provides high mechanical strength and flexibility properties found in bacterial cellulose.

Methods of forming bacterial cellulose are known and include static and agitated processes. Typically, the bacterial cellulose (which may have a white or translucent appearance) may be formed under aqueous or liquid conditions in which the liquid comprises from about 80% to about 95% or from about 81%, 82%, 83%, 84%, 85%, 86%, 87%, 88%, 89%, 90%, 91%, 92%, 93%, 94%, or about 95%, or within any range that can be formed from the preceding values. To that end, the described methods of making the synthetic wood may include the use of bacterial cellulose formed by any process. In some embodiments, the method of forming the bacterial cellulose may include the use of bacteria from a waste stream from the production of kombucha, nata de coco, and similar products. Suitable bacteria that may be present in the waste stream from the production of kombucha and that may be useful in the described process include, but are not limited to the *Lactobacillus nagelii, Gluconacetobacter, Gluconobacter*, and *Komagataeibacter* species. As an example, a suitable *bacterium* is *Komagataeibacter xylinus*. According to at least some embodiments, the bacteria may be selected from a symbiotic culture of bacteria and yeast, or SCOBY culture. In some embodiments, the bacteria may be selected from the genera including *Acetobacter, Gluconobacter*, and combinations thereof. In some embodiments, the bacteria may be selected from *Bacterium gluconicum, Bacterium xylinum, Acetobacter xylinum, Acetobacter xylinoides, Acetobacter ketogenum*, and combination thereof. In some embodiments, the yeast may be selected from *Saccharomycodes ludwigii, Saccharomycodes apiculatus, Schizosaccharomyces pombe, Zygosaccharomyes, Saccharomyces cerevisiae*, and combinations thereof.

Broadly speaking, *Komagataeibacter xylinus* converts sugars into cellulose sheets. It is generally believed that the biosynthesis of bacterial cellulose occurs in a two stage process. First, the intracellular polymerization of glucose molecules into cellulose polymers, and second, the self-assembly of cellulose polymer chains into crystalline nanofibers, which self-weave into a three dimensional network to generate a gelatinous pellicle (also referred to as cellulose sheets). The cellulose sheets grow in water in at least some embodiments, often over the course of multiple days. In other embodiments, additional additives to the water can assist in the growth process.

In some embodiments, the source of sugar (glucose or fructose) for the bacteria can include food waste, agricultural residues, compost materials, animal waste, waste sawdust from wood processing, grass clippings, tree debris, other sources of organic matter often discarded by other industries, and/or the like, and combinations thereof.

According to at least some embodiments, the bacterial cellulose is formed and then blended to an even consistency. In some embodiments, the bacterial cellulose is blended while still damp. Alternatively, it is contemplated to form the bacterial cellulose, dry it for later use. In this instance, the dried bacterial cellulose may be crushed or ground (e.g., through blending, ball milling, compression methods, and/or the like) into particulates that may then be mixed with water and/or gel as described below.

In some instances, the bacterial cellulose (whether dried or not) may be mixed with water to form a viscous mixture in which the bacterial cellulose is incoherent and obtains a visual appearance of a brown color. It is contemplated that mixture will be free of oil and other water immiscible fluids. The mixing may be performed using any suitable mixer that will be sufficient to impart significant and complete mixing of the bacterial cellulose in the water. In this regard, it is noted that the mixture will contain a ratio of bacterial cellulose to water in a range of about 0.75:1.5 to about 1.5:0.75, by weight. In some instances, the ratio is about 1:1.

The mixing may be conducted at any suitable temperature although in some embodiments, the mixing may be performed at a temperature higher than room temperature. In at least some embodiments dependent on the content of the water-based solution mixture, this heating occurs over an open flame. In other embodiments, heating occurs in a closed vessel within a heated liquid bath. In further embodiments, inductive heating elements are used either externally or internally to the vessel containing the bacterial cellulose and water mixture. In at least some embodiments, heating may occur up to a temperature of about 70% of the sublimation temperature, but does not extend to the point of boiling. In at least some embodiments, such as when the bacterial cellulose and water mixture is at least 95% water, the mixture may be heated to a temperature ranging from about 80° C. to about 100° C. (so long as the temperature is below the boiling point). To that end, the temperature may be about 80° C., 81, 82, 83, 84, 85, 86, 87, 88, 89, 90, 91, 92, 93, 94, 95, 96, 97, 98, 99, or about 100° C. or within any range that can be formed from the preceding values.

The bacterial cellulose and water mixture may be mixed with a gel and in some instances, the bacterial cellulose may be embedded into the gel. In other instances, the gel may be mixed with water to form a gel solution to which the bacterial cellulose and water mixture (where the bacterial cellulose is dried or as a bacterial cellulose solution), may be combined. In this case, either or both of the gel solution and the bacterial cellulose and water mixture may be heated prior to, during, or after combining.

Suitable gels may include, but are not be limited to agar, algae-based ingredients, organic gelatins, xanthan gum, alginate, carrageen, hydrocolloids such as alginates including sodium alginate and propylene glycol alginate, carrageenans, cellulose gum, colloidal microcrystalline cellulose (MCC), gellan gum, guar gum, gum Arabic, locust bean gum, and/or the like, and combinations thereof. In some embodiments, the gel is agar powder The gel may be added in sufficient amounts to provide between about 5% to about 35% of the combined mixture (i.e., the mixture containing the bacterial cellulose, water, binders, and additives). In some instances, the gel may be added in an amount from about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, or about 35%, or within any range that can be formed from the preceding values. Where agar powder is used, it is contemplated that it will be present in the combined mixture in amounts between about 15% and about 20% with respect to the amount of bacterial cellulose in the combined mixture.

According to at least some embodiments, it is contemplated to include one or more binders before, during, or after mixing the bacterial cellulose and water mixture with the gel or gel solution. It is contemplated that the binder may be added mixed with water (with or without heating) prior to adding. A plurality of binders are contemplated and may include, but are not limited to, guar gum, ammonium lignosulfonate, chitosan, lignin, arrowroot, cassava, tapioca, *yucca*, manioc, organic starches including potato starch, pectin, [poly (Acrylic acid-co-N-Methylol Acrylamide-co-Butyl Acrylate) Copolymer Grafted Carboxymethyl Cellulose], soy proteins, polyacrylic acids, liquid plant hydrolysate, magnesium oxide, xanthan gum, agar, seaweed extracts, kelp, sulfite liquor, wheat flour, sucrose, and similar compounds and combinations thereof.

According to at least some embodiments, it is contemplated to include one or more additives before, during, or after mixing the bacterial cellulose and water mixture with the gel or gel solution. The additive or additives may be chosen to adjust or improve the physical properties of the resulting synthetic wood. Such properties include hydrophobicity, which can be improved through additives such as polyhydroxyalkanoate (PHA), polylactide (PLA), polybutylene adipate terephthalate (PBAT), polybutyl succinate (PBS), cellophane, glycerol monostearate, shellac and other natural finishes, waxes, natural gums, castor oil and similar natural oils such as flax and linseed oil, natural resins, menthol crystals, and zein. Other additives such as a dye or colorant may be added. Similarly, it has been contemplated that glycerin or other alcohol or polyol may be added at any time prior to compressing the semi-solid mass.

The combining of the bacterial cellulose, gel, binder, and additive may be effected with continual or intermittent stirring and with the application of heat to provide a slurry that, in some instances, presents a faded green visual appearance. According to at least some embodiments, the combining may be effected using a mechanical apparatus such as an industrial mixer for a period of time to ensure even distribution of all ingredients and to improve the mechanical integrity of the final product. The period of time may range from one to several hours. The combined mixture exhibits a linear or first order exponentially reduced viscosity as heat is applied. In some instances, the combined mixture is heated to the approximate gelling temperature of the gel being used. For example, where the gel is agar, the combined mixture may be heated to a temperature between about 32° C. to about 45° C.

Referring back to FIG. 1, after the combined mixture containing the bacterial cellulose and gel (and any binder or additive) is formed, the combined mixture may be cooled in place or may be transferred to one or more molds of any suitable structure such that the mold is capable of retaining the combined mixture. It will be appreciated that as the combined mixture cools, for example, at room temperature, it will begin to form into a semi-solid formed mass. It will also be appreciated that as the combined mixture cools at room temperature, it will be dehydrated as water evaporates from the combined mixture.

Additionally or alternatively, the combined mixture may be subjected to other forms of dehydration under suitable conditions and for a suitable period of time to remove a significant amount of water and/or liquid present in the mixture to form a semi-solid mass having a dark appearance, is dense, and exhibits a hard outer surface. The combined mixture may be dehydrated using any suitable method or apparatus such as but not limited to driers (tunnel, kiln, cabinet, vacuum, drum, roller, etc.), microwaves, infrared apparatuses, and the like. The dehydration may occur at any suitable temperature such as between about 35° C. to about 90° C. or a maximum of about 85° C., 80° C., 75° C., 70° C., 65° C., 60° C., 55° C., or about 50° C. The dehydration (drying) may occur for a period of time ranging from about 4 hours to about 200 hours, or from about 12 hours to about 150 hours, or from about 24 hours to about 100 hours or from about 48 hours to about 70 hours. In some instances, the dehydration (drying) is conducted in a step-wise manner such that the initial dehydration parameters (e.g., temperature and humidity) are controlled to ensure an even and steady evaporation of water and, after a pre-determined period of time, the temperature may be increased and the humidity may be decreased in one or more steps until completion of the drying. In this regard, the initial temperature typically will not exceed 50° C. and will not exceed an average humidity between about 40% to about 60%, or within any range that can be formed from the preceding values.

Figure 2:
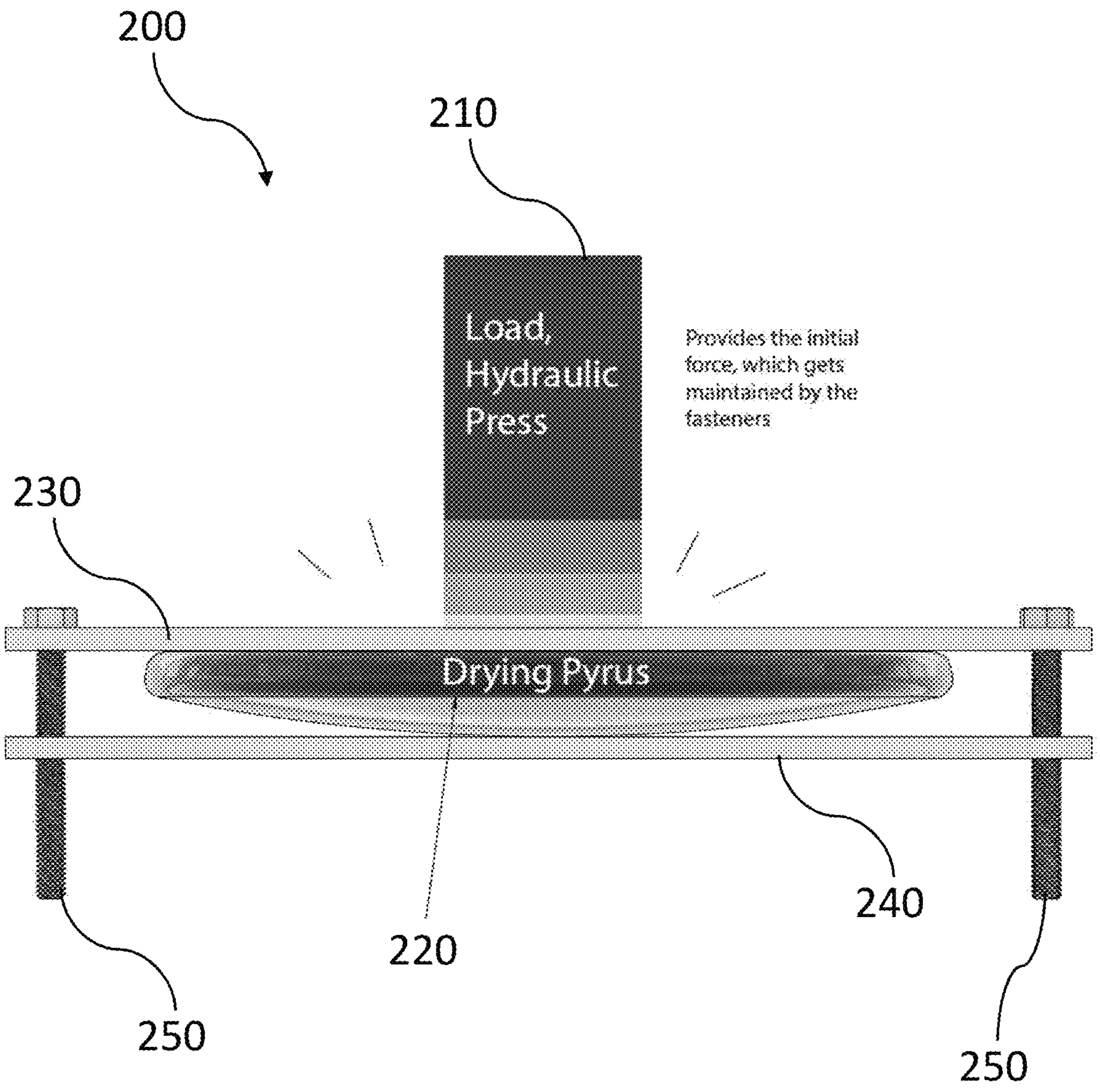
FIG. 2 is a side view of a compression apparatus for use according to the described process.
Figure 3:
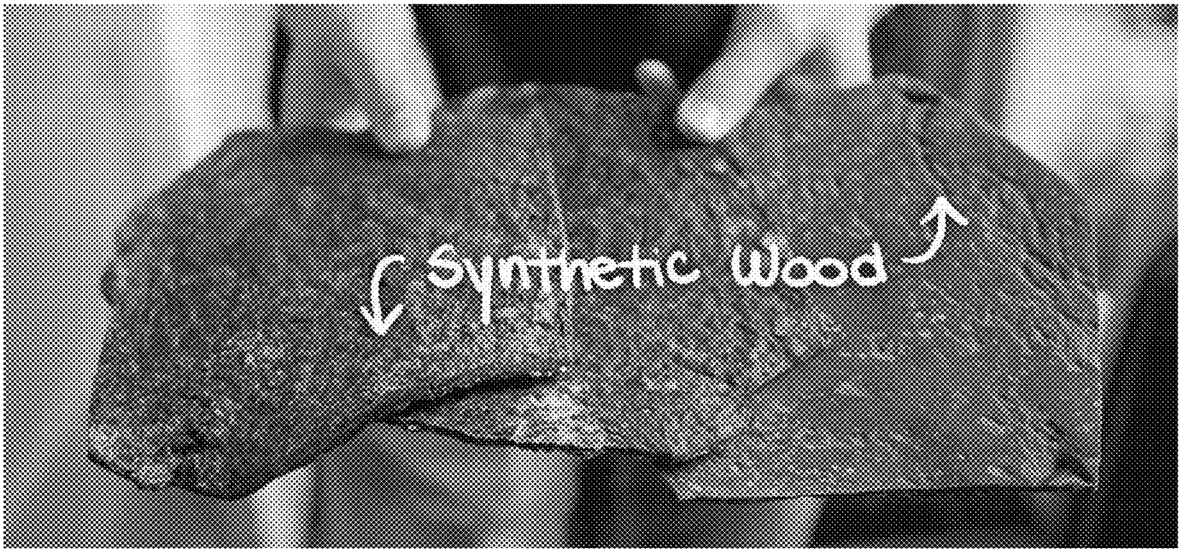
FIG. 3 is an image of a synthetic wood product produced by the described methods.

Turning back to FIG. 1, the semi-solid mass is then subjected to compression for a period of time and at a selected temperature to achieve a desired thickness for the resulting synthetic wood. The desired thickness may range from about 1 mm to about 25 cm, or from about 1 cm to about 10 cm, or from about 1, 2, 3, 4, 5, 6, 7, 8, 9, or about 10 cm. The compression may be effected along a single axis, although it is contemplated that the semi-solid mass may be compressed along one, two, or three axes. The compression can be effected using any suitable apparatus. In one instance, the compression may be effected by compressing the semi-solid mass between two opposed plates (that may be formed of metal or other materials) that may be clamped together in a manner permitting an increase and decrease in the compression force applied to the semi-solid mass. As shown in FIG. 2, the compression force may be maintained or varied by a combination of a hydraulic press 210, metal plates 230 and 240, and retainers 250. According to at least some embodiments, other press methods may be used, including but not limited to precision hydraulic presses 210, centrifugal presses, and pneumatic mass presses.

In some embodiments, it is contemplated that the compression may be conducted at room temperature. Alternatively, it is contemplated to further dehydrate the semi-solid mass while under compression by subjecting the semi-solid mass to a finish drying process to remove all or substantially all the water present to provide a finished synthetic wood product having less than 5% water, or less than 4%, 3%, 2%, 1%, 0.5%, or less than about 0.1% water.

The drying may be effected at a temperature ranging from about 50° C. to about 90° C., or about 50° C., 55° C., 60° C., 65° C., 70° C., 75° C., 80° C., 85° C., to about 90° C., or within any range that can be formed from the preceding values for a period of time ranging from about 4 hours to about 100 hours or about 12 hours to about 50 hours, or within any range that can be formed from the preceding values. The compression and drying may be performed simultaneously and it will be appreciated that the drying may use lower temperatures for longer periods of time or higher temperatures for shorter periods of time. Upon completion of the compression and drying step, the resulting synthetic wood will be formed.

In at least some embodiments, the synthetic wood has a consistency, hardness, and flexibility allowing it to be easily and precisely cut using precision fabrication tools like laser cutters and CNC machines. Using various curing (drying or dehydration) techniques deployed in some embodiments, the material 114 can be made to resemble high-value woods, i.e., those woods available in limited supply and/or are or are typically sourced by logging that is known to cause forest degradation and likely precipitate deforestation or other environmental concerns.

Figure 4:
FIG. 4 is an image of an article formed from the synthetic wood product of FIG. 9 according to the described methods.

The synthetic wood can be used to create wood-like products including but not limited to small wood-like products, such as guitar picks and jewelry. In other embodiments, the synthetic wood can be used for cabinet making, toys, turning blanks, sculptures, veneers, kitchen decor, instruments, flooring, veneers, plywoods, and other items crafted from tree-based wood such as shown in FIG. 4. Unlike other, the synthetic wood formed according to the described methods contains a three dimensional matrix of cellulose and gel that is stable at room temperature. Unlike a pure bacterial cellulose material, the synthetic wood according to the described methods is more stable under hydrophilic or high-moisture conditions.

It is contemplated that the exterior surface of the synthetic wood may be coated with a finish, such as a wood finish, including but not limited to nitrocellulose lacquer or polyurethane based finishes. In such embodiments, the water resistance of the compound is improved. In some embodiments, the wood finish includes an evaporative wood finish, which dries via solvent evaporation (e.g., shellac, nitrocellulose lacquers, wax). In some embodiments, the wood finish includes a reactive wood finish, which cures via a chemical reaction (e.g., polyurethane varnish). In further embodiments, the wood finish includes a coalescing wood finish, which dries by both chemical reaction and solvent evaporation (e.g., water-based finishes, such as latex paint). The skilled artisan will appreciate that the above coatings and other various methods may be used to increase the water resistance of the resulting synthetic wood.

Figure 5:
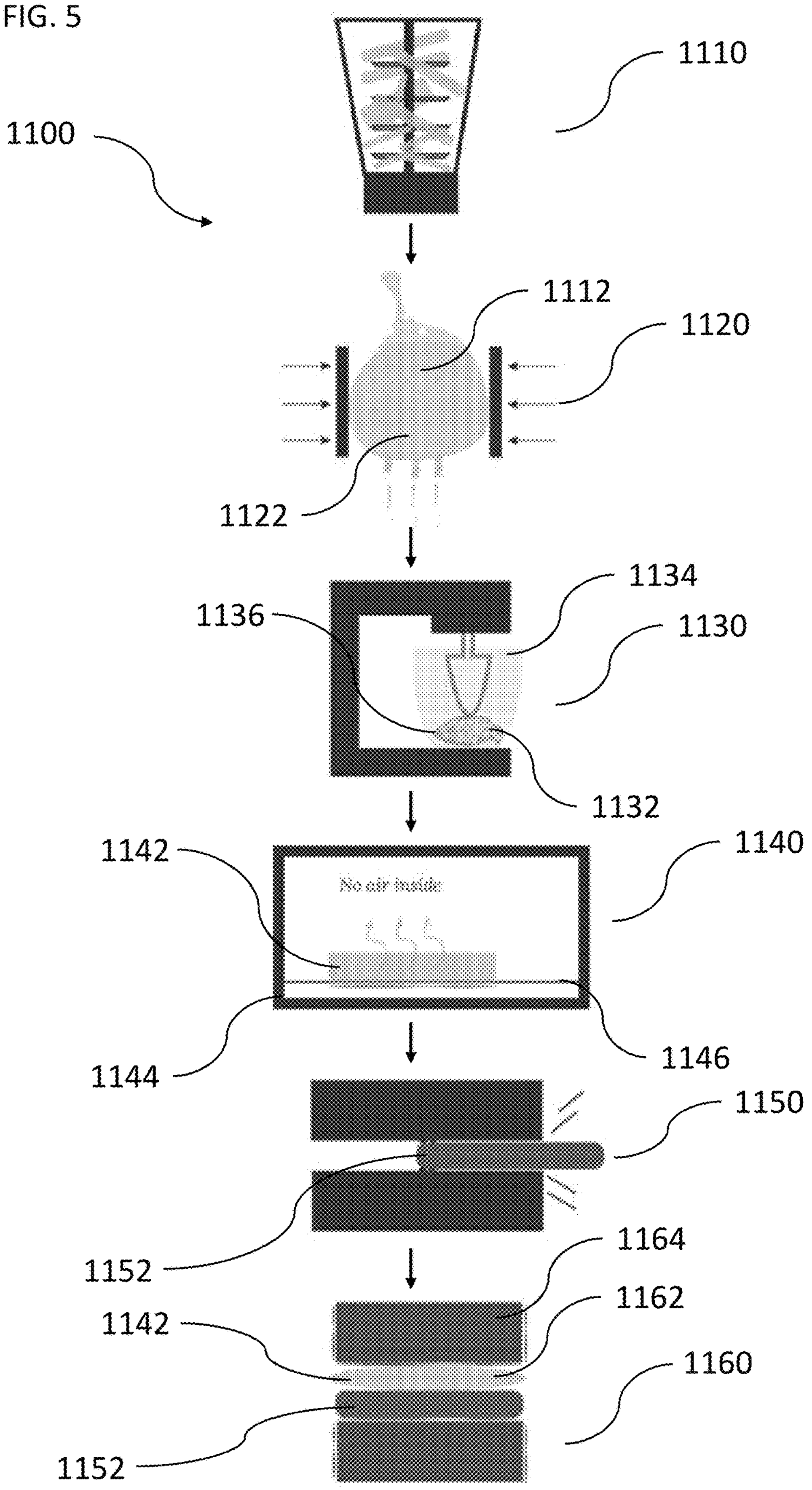
FIG. 5 depicts another embodiment of a process for producing synthetic wood products as an alternative to natural wood (plant cellulose) and plastic.

Turning now to FIG. 5, a schematic view of a process for creating a synthetic wood from bacterial cellulose as an alternative to woods (plant cellulose) and plastics is shown. In this embodiment, bacterial cellulose is provided and blended to an even consistency 1110. According to at least some variants, the bacterial cellulose can be formed from waste materials produced by manufacturing processes within the kombucha industry. However, it is contemplated that the bacterial cellulose may be provided by any suitable method or source. The blending step can be accomplished using a kitchen blender, although for commercial applications, other methods of blending such as ball milling and other industrial pulverization methods may be used to produce a blended mixture 1112.

Subsequently, the blended mixture may be compressed. The compression may be along a single axis or may be along one two, or three axes, as described above. In the illustrated embodiment, the compression may be conducted while the blended mixture 1112 is contained by a strainer or a filter 1122 that is permeable to water, but not to the solid mass of the blended mixture. According to at least some iterations of this embodiment, after the compression, approximately 15% of the mass of blended mixture 1112 remains as a condensed mixture 1132. According to at least some embodiments, the condensed mixture 1132 has flour-dough-like consistency. The condensed mixture 1132 is then worked or mixed to an even consistency in an apparatus known to mix soft solids, such as an industrial mixer 1134 at step 1130.

An additive 1136 such as those described above may be added to the condensed mixture before, during, or after the condensed mixture is worked or mixed. Typically, the additive is added before or during the working or mixing of the condensed mixture. In at least one embodiment, the additive material is guar gum. The guar gum may be added as a powder or a solution. The guar gum may be added in an amount from about 0.5% to about 5% of the mass of the condensed mixture to create a precursor mixture 1142. In some instances, the guar gum is added in an amount from about 0.5%, 0.6%, 0.7%, 0.8%, 0.9%, 1%, 2%, 3%, 4%, or about 5% %, or within any range that can be formed from the preceding values.

According to other embodiments, the additive material 1136 may be a gel material including a hydrocolloid which, in some embodiments, may include one or more of alginates (e.g., sodium alginate, propylene glycol alginate), carrageenans, cellulose gum, colloidal microcrystalline cellulose (MCC), gellan gum, gum Arabic, locust bean gum, xanthan gum, and/or the like, and combinations thereof. According to other or the same embodiments, the additive can be chitosan, ammonium lignosulfonate, or a combination thereof. In at least one embodiment the additive material may be a combination of chitosan and ammonium lignosulfonate. In this instance, the chitosan may be added as an approximately 4% molecular weight solutions and the ammonium lignosulfonate may be added as an approximate 49% aqueous solution at approximate. The chitosan and ammonium lignosulfonate may be added to the condensed mixture in an amount such that each of the chitosan and ammonium lignosulfonate are present at about 5% to about 20% of the mass of the condensed mixture. In some instances, each of the chitosan and ammonium lignosulfonate are present at about 5%, 6%, 7%, 8%, 9%, 10%, 11%, 12%, 13%, 14%, 15%, 16%, 17%, 18%, 19% or about 20%, or within any range that can be formed from the preceding values or the mass of the condensed mixture.

The precursor material, which is a semi-solid material, may then be subjected to compression using the same or similar compression apparatuses described above and in the same manner as described above, while being subjected to a vacuum kiln to dehydrate or dry the precursor material to remove all or significantly all of the water or moisture (to the same levels as noted above). According to some embodiments of step 1144, the vacuum kiln 1144 develops a vacuum of at least twenty inches of mercury while the kiln is heated to a temperature of approximately 125° F., though these parameters may be adjusted according to the volume of the kiln 1144 and the composition of the precursor mixture 1142 amongst other parameters. In this regard, both the vacuum and the temperature are selected to minimize cracking of the precursor mixture throughout the drying process to form a raw synthetic wood The raw synthetic wood may then be sanded, planed or otherwise resurfaced at step 1150, to remove surface imperfections such as apertures. Thereafter, in a final finishing step 1160, in some embodiments, a new outer surface 1162, consisting of a thin layer precursor mixture 1142 is added to one or more exterior surfaces of the raw synthetic wood after which, materials are compressed and further dried as above in step 1140.

Figure 6:
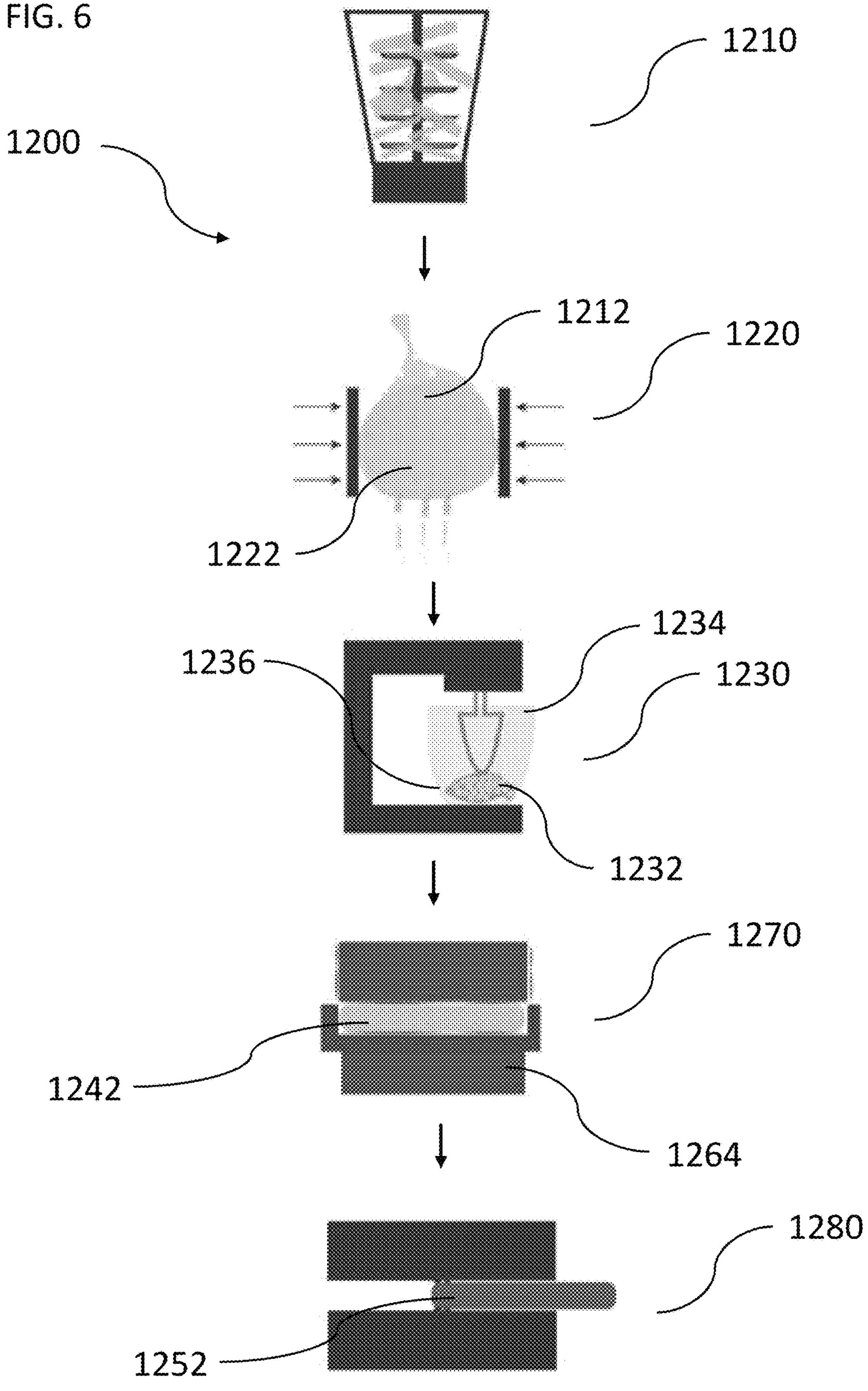
FIG. 6 depicts another embodiment for producing synthetic wood products as an alternative to natural wood (plant cellulose) and plastics.

FIG. 6 shows a schematic view of a process for creating a synthetic wood from bacterial cellulose as an alternative to woods (plant cellulose) and plastics 1200. It will be appreciated that the process depicted in FIG. 6 is generally the same as that shown in FIG. 5 with the following differences. The process according to FIG. 6 may or may not include vacuum drying and it does not include a step of adding to one or more exterior surfaces of a raw synthetic wood a layer of precursor mixture. In this regard, if vacuum drying is not used, an alternative such as an enclosed heat press 1264 may be used, which is capable of reducing the drying time compared to other described embodiments. The enclosed heat press is an apparatus that is configured to retain the precursor mixture within a specified boundary while compression and heat are applied. The result is unfinished or raw synthetic wood, which may then be sanded, planed or otherwise resurfaced at step 1280 to remove surface imperfections such as apertures.

According to at least some embodiments, a bacterial cellulose need not be blended or otherwise pulverized. In at least some of such embodiments, bacterial cellulose can be grown in large vats or other containers that are greater in size than the desired wood substitute sample to be produced. The cellulose can grow in sheets in these vats, and cut to size based on the wood substitute sample to be produced. In some embodiments the sheets can be coated in a binder, such as those mentioned elsewhere in this disclosure. These sheets can then be stacked, compressed in a hydraulic or pneumatic press, and dried in a heat press or vacuum kiln. According to at least some of such embodiments, these compressed sheets maintain the tensile strength naturally present in bacterial cellulose.

According to at least some embodiments, bacterial cellulose can be blended, dried, and then ground into a fine dust or powder, prior to curing in a heat press, vacuum kiln, oven, dehydrator, or air dryer. According to at least some of such embodiments, this technique can minimize shrinking in the drying process. According to at least some of such embodiments a dust or fine powder of bacterial cellulose, or a mixture thereof with binders or additives disclosed herein, can be utilized in connection with an additive manufacturing process such as 3D printing and binder jet 3D printing.

In at least some embodiments, bacterial cellulose can be produced with a binder included in the cellulose generation process. According to at least some embodiments, a fermentation vessel is inoculated to initiate bacterial cellulose growth. Lignosulfonate or other lignin derivatives can be added to the fermentation vessel to fuel bacteria growth. Cellulose is then allowed to grow in some embodiments over a period of days, and then cellulose infused with the additive lignosulfonate is removed from the vessel. According to other or the same embodiments, other additives listed herein can be used. In at least some embodiments, cellulose that is infused can then be soaked in a reducing agent. According to at least some embodiments, reducing agents can include acids such as ascorbic acid or other such agents disclosed herein.

In another alternative, the bacterial cellulose (formed by any suitable manner) may be blended in an aqueous solution to which a pH modulating agent may be added to modulate the pH of the solution so that the pH of the solution is between about 7.0 and 8.0. The pH modulating agent may be any ingredient suitable for modulating the pH and exemplary ingredients include, but are not limited to sodium hydroxide, potassium hydroxide, magnesium hydroxide, calcium hydroxide, sodium bicarbonate, potassium bicarbonate, magnesium carbonate, calcium carbonate, and mixtures thereof. Thereafter, the water or liquid is removed from the solution to form a semi-solid mass.

The semi-solid mass may then be treated with one or more fungi, by injecting a fungus solution into the semi-solid mass or by coating the exterior surface of the semi-solid mass, or both. The fungus may be any suitable fungus such as yeast, mold, mushrooms, and mixtures thereof. In one instance, the fungus is a mushroom such as a pearl oyster mushroom. The treated semi-solid mass is allowed to cure over a period of time so that a mycelium root network propagates and hydrophobic proteins are incorporated into the cellulose structure, which will reinforce the resulting synthetic wood and provide water resistance, respectively. The period of time may range from 1 day to 28 days, or from 1, 2, 3, 4, 5, 6, 7, 8, 8, 10, 11, 12, 13, 14, 15, 16, 17, 18, 19, 20, 21, 22, 23, 24, 25, 26, 27, or 28 days.

Upon completion of the curing, the cured semi-solid mass may be pasteurized to terminate the growth of the fungus and to form the synthetic wood. Pasteurization may be accomplished in any suitable manner such as by heating the cured semi-solid mass at a high temperature for a period of time sufficient to terminate the fungus. A suitable temperature may range from about 80° C. to about 120° C. and a suitable period of time may range from about 1 second to about 120 seconds.

After pasteurization, it is contemplated that the material may be compressed to the desired final shape, as described above, and dehydrated to remove any remaining residual water to form the synthetic wood.

Colors and sizes show in drawings presented herewith are representative. However, in some embodiments, the agar, water-based solution, and cellulose combination may initially have a light brown color. In such embodiments, agar, water-based solution, and cellulose combination may turn a darker beige and shrink during a first drying session, ultimately shrinking further throughout the method disclosed herein to resemble a dark brown color.

It will be appreciated that, according to the above-described methods, a synthetic wood product having suitable and desirable physical properties can be formed. The synthetic wood comprises bacterial cellulose and a gel. The gel may be selected from agar, algae-based ingredients, organic gelatins, xanthan gum, alginate, carrageen, hydrocolloids such as alginates including sodium alginate and propylene glycol alginate, carrageenans, cellulose gum, colloidal microcrystalline cellulose (MCC), gellan gum, guar gum, gum Arabic, locust bean gum, and/or the like, and combinations thereof. In some embodiments, the synthetic wood may include one or more binders and additives.

When binders are included, they may be selected from guar gum, arrowroot, cassava, tapioca, *yucca*, manioc, organic starches including potato starch, pectin, [poly (Acrylic acid-co-N-Methylol Acrylamide-co-Butyl Acrylate) Copolymer Grafted Carboxymethyl Cellulose], soy proteins, polyacrylic acids, liquid plant hydrolysate, magnesium oxide, xanthan gum, agar, seaweed extracts, kelp, sulfite liquor, wheat flour, sucrose, chitosan, and similar compounds and combinations thereof. Binders may further be selected from lignin and assorted derivatives thereof such as ammonium lignosulfonate, calcium lignosulfonate, sodium lignosulfonate, magnesium lignosulfonate, and ferrous lignosulfonate, kraft lignin, organosolv lignin, and similar compounds and combinations thereof.

When additives are included, they may be selected from polyhydroxyalkanoate (PHA), polylactide (PLA), polybutylene adipate terephthalate (PBAT), polybutyl succinate (PBS), cellophane, glycerol monostearate, shellac and other natural finishes, waxes, natural gums, castor oil and similar natural oils such as flax and linseed oil, natural resins, menthol crystals, zein, dyes, colorants, glycerin, alcohols, polyols, and combinations thereof.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

The invention claimed is:

1. A method for producing synthetic wood product comprising:

providing bacterial cellulose;

combining the bacterial cellulose with a gel to form a mixture;

at least partially dehydrating the mixture to form a semi-solid mass;

compressing the semi-solid mass; and dehydrating the compressed semi-solid mass to remove water present in the compressed semi-solid mass and to form the synthetic wood;

wherein the synthetic wood is free of plant cellulose.

2. The method of claim 1 wherein the bacterial cellulose is a solid dry product.

3. The method of claim 1 wherein the gel is selected from agar, organic gelatins, xanthan gum, alginate, carrageen, hydrocolloids, sodium alginate, propylene glycol alginate, carrageenan, cellulose gum, microcrystalline cellulose (MCC), gellan gum, guar gum, gum Arabic, locust bean gum, and mixtures thereof.

4. The method of claim 1 further comprising adding a binder before, during, or after combining the bacterial cellulose with the gel.

5. The method of claim 4 wherein the binder is selected from guar gum, ammonium lignosulfonate, chitosan, lignin, arrowroot, cassava, tapioca, *yucca*, manioc, organic starch, potato starch, pectin, poly (Acrylic acid-co-N-Methylol Acrylamide-co-Butyl Acrylate) Copolymer Grafted Carboxymethyl Cellulose, soy protein, polyacrylic acid, liquid plant hydrolysate, magnesium oxide, xanthan gum, agar, seaweed extract, kelp, sulfite liquor, wheat flour, sucrose, and mixtures thereof.

6. The method of claim 1 further comprising adding an additive before, during, or after combining the bacterial cellulose with the gel.

7. The method of claim 6 wherein the additive is selected from polyhydroxyalkanoate (PHA), polylactide (PLA), polybutylene adipate terephthalate (PBAT), polybutyl succinate (PBS), cellophane, glycerol monostearate, shellac, wax, natural gum, castor oil, flax oil, linseed oil, menthol crystals, zein, dyes, colorants, glycerin, alcohols, polyols, and mixtures thereof.

* * * * *